Patented Sept. 10, 1946

2,407,376

UNITED STATES PATENT OFFICE 2,407,376

COLLOIDALLY DISPERSED DIMETHYLOL UREA RESINS

Charles S. Maxwell, Old Greenwich, Conn., assignor to American Cyanamid Company, New York, N. Y., a corporation of Maine No Drawing. Application October 31, 1942, Serial No. 464,109

9 Claims. (Cl. 260—29)

This invention relates to colloidally dispersed urea-aldehyde compositions including dispersions containing both urea-aldehyde and melamine-aldehyde resins and to their methods of manufacture. The invention includes colloidal aqueous solutions of partially polymerized, negatively charged urea-formaldehyde resins, their methods of preparation, and mixtures thereof with colloidal, positively charged melamine-aldehyde resins.

I have discovered that dimethylol urea and water-soluble dimethylol urea derivatives such as the mono- and diethers of dimethylol urea with lower aliphatic mono- and polyhydric alcohols can be prepared in a colloidally dispersed condition wherein they possess new and hitherto unsuspected properties. I have found that aqueous solutions of dimethylol urea and its water-soluble derivatives can be converted in the presence of sulfur dioxide to a partially polymerized condition having a degree of polymerization less than that which characterizes the state of undispersible gel and precipitate formation, but sufficient to render the resin particles water-soluble and colloidal in character. I have also discovered, as one of the most important features of my invention, that dimethylol urea, dimethylol thiourea and their water-soluble reaction products with alcohols will acquire a definite negative electrical charge when partially polymerized to the colloidal state, as outlined above. The negative charge on the resin particles is shown by their migration toward the anode upon electrophoresis of the solution.

The colloidal anionic dimethylol urea and thiourea solutions of my invention are of extreme commercial importance for a number of uses. By reason of their migration toward and deposition upon the anode upon electrophoresis they can be deposited uniformly upon metal or metallized surfaces of irregular shape, which permits the coating of metals with these resins by electrodeposition. I have also found that the resin particles will deposit themselves upon positively charged fibrous materials such as asbestos and glass fibers and animal fibers such as wool, felt, furs, etc., even from dilute solutions and that felted products of improved wet and dry tensile strength are obtained when animal and mineral fibers treated with the resin in this manner are formed into paper or molded into insulating board. However, these felted fibrous products of improved wet strength are not claimed as such in the present application since they constitute the subject matter of my copending application Serial No. 465,480, filed Nov. 13, 1942.

The colloidal solutions or dispersions of the present invention may be prepared from dimethylol urea, or from the water-soluble monoethers of dimethylol urea with methyl, ethyl or other lower aliphatic monohydric alcohols or with the corresponding reaction products of dimethylol urea with equimolecular quantities of lower aliphatic polyhydric alcohols such as ethylene glycol. The corresponding reaction products of dimethylene glycol, triethylene glycol, or the corresponding propylene or butylene glycols may also be used. Diethers of dimethylol urea with lower aliphatic monohydric alcohols such as methanol or ethanol may be employed insofar as these materials can be rendered soluble in water or in aqueous solutions of sulfur dioxide, and the same is true of the corresponding reaction products of dimethylol urea with polyhydric alcohols and their ethers such as ethylene glycol, diethylene glycol and the like. Dimethylol thiourea and its water-soluble reaction products with alcohols corresponding to those outlined above may also be used. It is evident, therefore, that the compounds which form the starting materials for the preparation of the colloidal solutions or dispersions of my invention are compounds of the formula:

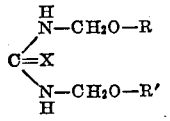

wherein R and R' are members of the group consisting of hydrogen and lower alkyl, hydroxyalkyl and alkoxyalkyl radicals and X is oxygen or sulfur. For purposes of simplicity and clearness the following description will be made with reference to dimethylol urea, but it should be understood that any other water-soluble or acid-soluble compound corresponding to this formula may be substituted for dimethylol urea with equivalent results.

Insofar as I have been able to determine, sulfur dioxide is unique in its property of causing the formation of colloidally dispersed anionic dimethylol urea resins. I have attempted to prepare similar colloidally dispersed solutions by acidifying aqueous solutions of dimethylol urea and its derivatives with acetic acid, oxalic acid, hydrochloric acid, sulfuric acid and a number of other organic and inorganic acids, but in no case was an anionic, colloidally dispersed resin solution obtained.

The colloidal aqueous solutions of partially polymerized, negatively charged dimethylol urea and water-soluble dimethylol urea ethers are prepared by first dissolving the unpolymerized or only slightly polymerized urea resin in an aqueous solution of sulfur dioxide, or by dissolving the resin in water and adding sulfur dioxide, preferably as an aqueous solution. Sufficient sulfur dioxide should be added to reduce the pH of the resin solution below 3.0 and preferably below 2.0 as measured by the glass electrode method, since the colloidal resin solution is not obtained if insufficient sulfur dioxide is used. On the other hand, too much sulfur dioxide will also fail to produce the anionic colloidal resin solution; when enough sulfur dioxide is added to reduce the pH of the resin solution substantially below 0.5 the desired colloid is not obtained. As a practical matter I have found that the addition of from 5 to 50 cc. of a water solution containing 3.5% by weight of sulfur dioxide to a water solution containing 10 grams of dimethylol urea will produce the optimum degree of acidity; when the solution is made up to 100 cc. this corresponds to a pH range of about 2.0 to about 0.8. Correspondingly larger quantities of dimethylol urea ethers can be substituted on the basis of the increase in molecular weight. Thus, for example, 12.5 grams of dimethoxy dimethyl urea will require the same amount of $SO_2$ solution (10–50 cc.) as 10 grams of the dimethylol urea.

In preparing the colloidal resin solutions the clear aqueous solutions of dimethylol urea or its derivatives are allowed to age after acidification with the proper quantity of sulfur dioxide, as outlined above. The formation of a haze indicative of the colloidal condition begins sooner at elevated temperatures than at lower temperatures; at room temperatures the solution becomes hazy after about 10 minutes in a 10% resin solution. In solutions of relatively high solids content the haze develops extremely rapidly and the solution will quickly form an undispersible gel if not diluted with water. However, by diluting the solution with water after the haze is first formed I have succeeded in obtaining colloidal, negatively charged dimethylol urea solutions that are stable for several hours, during which time they can be applied to aqueous suspensions of asbestos or glass fibers or plated upon metallic surfaces.

Resins deposited from the colloidal aqueous solutions of my invention, either by electrodeposition or by adsorption or deposition upon positively charged fibrous material such as asbestos are easily and rapidly cured to the infusible and insoluble state by simple heating. In these resins the sulfur dioxide functions both as a colloid-forming agent and as a curing agent. Other acids such as hydrochloric acid and acetic acid will of course act as curing accelerators for the dimethylol ureas, but they will not produce colloidal, negatively charged solutions from resins of this type.

In the copending application of Charles S. Maxwell and Chester G. Landes, Serial No. 453,032, filed July 31, 1942 it is shown that cellulosic products of improved wet strength can be obtained by treating fibers of cellulosic material with a colloidal solution of cationic melamine-aldehyde resin followed by forming the treated fibers into a felted product and heating the felted product to cure the melamine-aldehyde resin. The colloidal solution of cationic melamine-aldehyde resin used in the process described in that application was prepared by dissolving a melamine-aldehyde resin such as trimethylol or tetramethylol melamine in hydrochloric, acetic, formic, phosphoric, sulfurous or other acids in quantities sufficient to produce a 15% aqueous solution having a pH less than 4.0 and usually below 3.0, followed by ageing the acidified solution until a blue haze develops indicative of the formation of a positively charged colloid.

I have now discovered that the coloidal cationic melamine-aldehyde resin solutions prepared by this method can be mixed with the colloidal anionic dimethylol urea solutions described above without precipitation or coagulation. Mixed solutions containing, for example, equimolecular amounts of urea and melamine resins or in any other ratio can be applied either to negatively charged fibers such as fibers of cellulosic material, for example kraft paper stock, or to positively charged fibers such as fibers of glass, asbestos, wool fibers, woven woolen cloth and the like. In either case a material proportion of both the melamine resin and the urea resin is adsorbed or taken up by the fibers and deposited thereon in the form of thin continuous films, and in both cases the resin can be cured on the fibers by heating at relatively low temperatures. It is therefore possible to apply these mixtures to cellulosic fibers such as paper stock, or to asbestos or other negatively charged fibers during the ordinary processes of paper manufacture as in the beater, immediately after the Jordon engines, the head boxes, the beater chest or elsewhere ahead of the paper-forming step in a paper mill. When either cellulosic fibers or asbestos fibers or mixtures thereof are treated with these mixed melamine-urea resin solutions, formed into paper or other felted products by the usual paper-forming methods and dried at 250–300° F. for about 1–5 minutes paper of improved wet and dry tensile strength, improved wet rub and fold resistance is obtained.

The invention will be illustrated in detail by the following specific examples to which, however, it is not limited.

*Example 1*

10 parts by weight of dimethylol urea were dissolved in warm water to make a concentrated solution which was cooled to room temperature. 20 parts by weight of a 3.5% solution of sulfur dioxide in water were added together with enough additional water to make 100 parts of solution. This was allowed to stand at room temperature and was watched carefully; after 10 minutes a haze developed and rapidly became more pronounced. After 13 minutes the polymerization was checked by adding sufficient cold water to dilute the solution to about 2% resin solids. The dilute solution was stable for several hours.

*Example 2*

20 ccs. of a 3.5% aqueous $SO_2$ solution were added to 100 ccs. of a solution containing 10% by weight of dimethylol urea and the mixture was allowed to stand at room temperature until a definite colloidal haze was developed. Sufficient cold water was then added to dilute the volume to 1000 ccs. At this point a sample of the solution was found to have a pH of 2.2 when measured by the glass electrode method.

A second solution was prepared by the same procedure using a sample of slightly polymerized dimethylol urea prepared by reacting 189 parts by weight of urea with 526 parts of neutral 37% formalin at a pH of 6.9–7.0 at 30° C. for 1 hour, heating to reflux and refluxing at atmospheric pressure for an additional 1 hour period. After preparation at approximately 10% solids and dilution to about 1% solids the colloidal anionic resin solution was found to have a glass electrode pH of 2.45.

The two resin solutions were subjected to electrophoresis between platinum electrodes. The apparatus used was a U-tube with an electrode inserted into each arm and a feed tube provided with a stop-cock attached to the bottom of the U. In this apparatus the colloidal resin solution could be covered with a layer of distilled water in either arm of the tube in order to permit easy observation of the migration and prevent a high rate of electrolysis caused by electrolytes in the solution. Platinum electrodes having an area of approximately one square inch were inserted in the two arms of the tube and a direct current of 120 volts was applied. The passage of current through the two above-described samples was continued for 22 hours and 21 hours, respectively.

In both cases a migration of the colloidal resin particles toward the anode was noted, and in both cases there was an actual deposition of resin in a thin layer upon the anode near the end of the test. The pH at the anode was 1.1 both at the start and at the end of the test, while the pH at the cathode was 6.65 at the start and 3.79 at the end.

Samples of the anolyte and catholyte were analyzed for nitrogen at the end of the test. 6.3 mg. of nitrogen were found in the anode chamber (25 ccs. volume) and 0.7 mg. of nitrogen in the cathode chamber (25 ccs. volume). The entire cell contained 49 mg. of nitrogen at the end of the test and 56.7 mg. at the start, indicating that dimethylol urea resin equivalent to 7.7 mg. had been deposited on the anode.

The foregoing procedure constitutes a relatively simple method of identifying the colloidal negatively charged dimethylol urea condensation products of the present invention, for no other type of urea-formaldehyde resin will migrate towards the anode upon electrophoresis. In carrying out this test, however, the presence of excessive amounts of electrolyte should be avoided, since large quantities of mineral salt or strong acid will carry the current in preference to the resin.

*Example 3*

The colloidal solutions of partially polymerized anionic dimethylol urea were further tested by application to asbestos fibers which were then formed into a felted sheet. The asbestos fiber was first dispersed by adding 800 g. of air-dried fiber to about 10 liters of water and circulating for 15 minutes in a ½ pound laboratory beater with the roll up. The stock was then diluted to 2% fiber content. Examples of the diluted asbestos stock were treated with the anionic dimethylol urea resin solution and formed into paper. The resin solution was added to the 2% stock suspension and stirred by hand only to the extent necessary to insure proper distribution of the resin without forming "ropes" or clusters of the asbestos fiber. The resin treated fiber was then made into hand sheets on a Valley sheet machine.

Instead of forming the sheet directly on the paper making wire of the Valley machine, canvas cloth was first placed on the wire and the sheet was formed on this. The water leg of the sheet machine was filled to the wire, then the cloth was placed flat on the wire and the deckle clamped shut. The pulp suspension and diluting water were added from the top (total volume 1.5 liters) so as not to disturb the cloth and the sheet drain valve was opened. To speed the formation of the sheet, a vacuum line was attached to the system and used when the efficiency of the water leg dropped off. After the water had drained off, the deckle was opened and the asbestos sheet and the cloth on which it was formed was pressed for 1 minute at 50 pounds pressure. The sheet was then removed from the cloth and dried for 5 minutes on a drum drier at 240° F. Treatment of this temperature was found to cure the resin within the time indicated.

A number of hand sheets were prepared by the above-described method and in some cases other materials were added to the stock such as wax size, alum, raw starch and mixtures thereof. In the preparation of these hand sheets each material was stirred into a sample of the 2% asbestos stock solution and allowed to stand 5 minutes before the addition of the next material.

In one instance asbestos pulp was treated with the colloidal dimethylol urea solution and cellulose fibers (kraft paper pulp) were treated with a colloidal melamine-formaldehyde resin. After standing for 5 minutes the two pulps were mixed and the mixture made into hand sheets.

The colloidal melamine-formaldehyde resin solution was made up as follows: 100 ccs. of water was heated to 140° F., 10.4 ccs. of 20° Bé. commercial hydrochloric acid was added and 25 g. of trimethylol melamine were stirred in. After complete solution, cold water was added to make up to final volume, and the solution was allowed to age 24 hours. This gave a colloidal cationic melamine resin solution containing 12% resin solids or 1 pound of resin per gallon of solution.

When this 12% solution was mixed with the colloidal dimethylol urea-$SO_2$ solution there was no precipitation of either resin. The discovery that a cationic colloidal melamine resin solution could be mixed with an anionic dimethylol urea solution was taken advantage of in treating a mixture containing 25% of fibers of cellulosic material (kraft paper stock) and 75% of fibers of asbestos with the thought that the melamine resin would be adsorbed or precipitated on the negatively charged cellulosic fibers and the anionic urea-formaldehyde resin on the positively charged asbestos fibers. Upon treating the fibers in this manner and forming hand sheets it was found that this actually occurred; analysis of the sheets for nitrogen indicated that both types of resin had been deposited on the fibers and the sheet possessed considerably increased wet strength as compared with similar sheets containing no cellulosic fibers.

Tests were also made in which a mixture containing about 25% of cellulosic fibers (kraft paper stock) and about 75% of asbestos fibers were first treated with the cationic melamine resin solution, using 3–5% of resin solids on the basis of the cellulosic material in the paper stock at a dilution of 0.5–1% of cellulosic fibers, and then adding the anionic urea-formaldehyde resin solution at a concentration of 1–2% on the basis of the asbestos fibers in the stock at a total stock dilution of 2–3% total solids. Hand sheets were also made from the mixture treated by this method and tested for wet strength, and it was found that they possessed a considerably greater degree of wet strength than other sheets treated with either the cationic melamine resin or the anionic urea resin alone.

Example 4

A colloidal anionic dimethylol urea resin solution was prepared as described in Example 1 and diluted to 1% resin solids. Fibers of wool were suspended in one portion of the solution and stirred for 5 minutes and the suspension was then filtered with suction on a Buchner filter. The filter cake, which consisted of a felted mass of wool fibers, was pressed and dried at 250° F. for 5 minutes. The fibers were then found to be cemented together by the cured resin.

A sample of woolen yarn and a sample of woven wool cloth were padded for 5 minutes in another sample of the 1% colloidal dimethylol urea resin solution. They were then squeezed to retain a weight of solution equal to the weight of the cloth, dried 10 minutes in an oven at 240° F., and pressed with a hot iron. Examination of samples showed that substantially more than 1% of resin was retained by the yarn and by the cloth, thus showing that the negatively charged resin particles were adsorbed by the positively charged wool fibers.

What I claim is:

1. A colloidal aqueous solution of a partially polymerized, negatively charged resinous compound of the formula

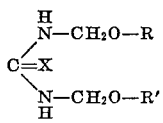

wherein X is a member of the group consisting of oxygen and sulfur and R and R' are members of the group consisting of hydrogen and alkyl, hydroxylalkyl and alkoxyalkyl radicals, said resin particles having a definite negative electrical charge as shown by their migration toward the anode upon electrophoresis of the solution.

2. A colloidal aqueous solution of a partially polymerized, negatively charged dimethylol urea resin, said resin particles having a definite negative electrical charge as shown by their migration toward the anode upon electrophoresis of the solution.

3. A colloidal aqueous solution containing colloidally dispersed particles of cationic melamine-aldehyde resin in admixture with colloidally dispersed particles of a partially polymerized, anionic resinous compound of the formula

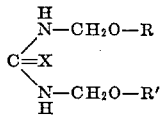

wherein X is a member of the group consisting of oxygen and sulfur and R and R' are members of the group consisting of hydrogen and alkyl, hydroxyalkyl and alkoxyalkyl radicals.

4. An aqueous dispersion containing colloidally dispersed particles of cationic melamine-aldehyde resin in admixture with colloidally dispersed particles of an anionic dimethylol urea resin.

5. A method of preparing a colloidal aqueous solution of a partially polymerized, anionic urea type resin which comprises preparing an aqueous solution containing a compound of the formula

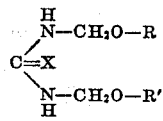

wherein X is a member of the group consisting of oxygen and sulfur and R and R' are members of the group consisting of hydrogen and alkyl, hydroxyalkyl and alkoxyalkyl radicals together with dissolved sulfur dioxide in amounts sufficient to maintain a pH below 3.0 but not below 0.5 and ageing the solution until a haze indicative of the colloidal state has developed.

6. A method of preparing a colloidal aqueous solution of a partially polymerized, anionic dimethylol urea resin which comprises preparing an aqueous solution containing a dimethylol urea together with dissolved sulfur dioxide in amounts sufficient to maintain a pH below 3.0 but not below 0.5 and ageing the solution until a haze indicative of the colloidal state has developed.

7. A method of preparing a colloidal aqueous solution of a partially polymerized, anionic dimethylol urea resin which comprises preparing an aqueous solution containing about 10% of dimethylol urea together with sufficient dissolved sulfur dioxide to maintain a pH range of about 2.0 to about 0.8, ageing the solution until a haze indicative of the colloidal state has developed, and diluting the solution with water to about 1-2% solids.

8. A colloidal aqueous solution of a partially polymerized, negatively charged dimethoxy dimethyl urea resin, said resin particles having a definite negative electrical charge as shown by their migration toward the anode upon electrophoresis of the solution.

9. A method of preparing a colloidal aqueous solution of a partially polymerized, anionic dimethoxy dimethyl urea resin which comprises preparing an aqueous solution containing dimethoxy dimethyl urea together with dissolved sulfur dioxide in amounts sufficient to maintain a pH below 3.0 but not below 0.5 and ageing the solution until a haze indicative of the colloidal state has developed.

CHARLES S. MAXWELL.